Figure 1:
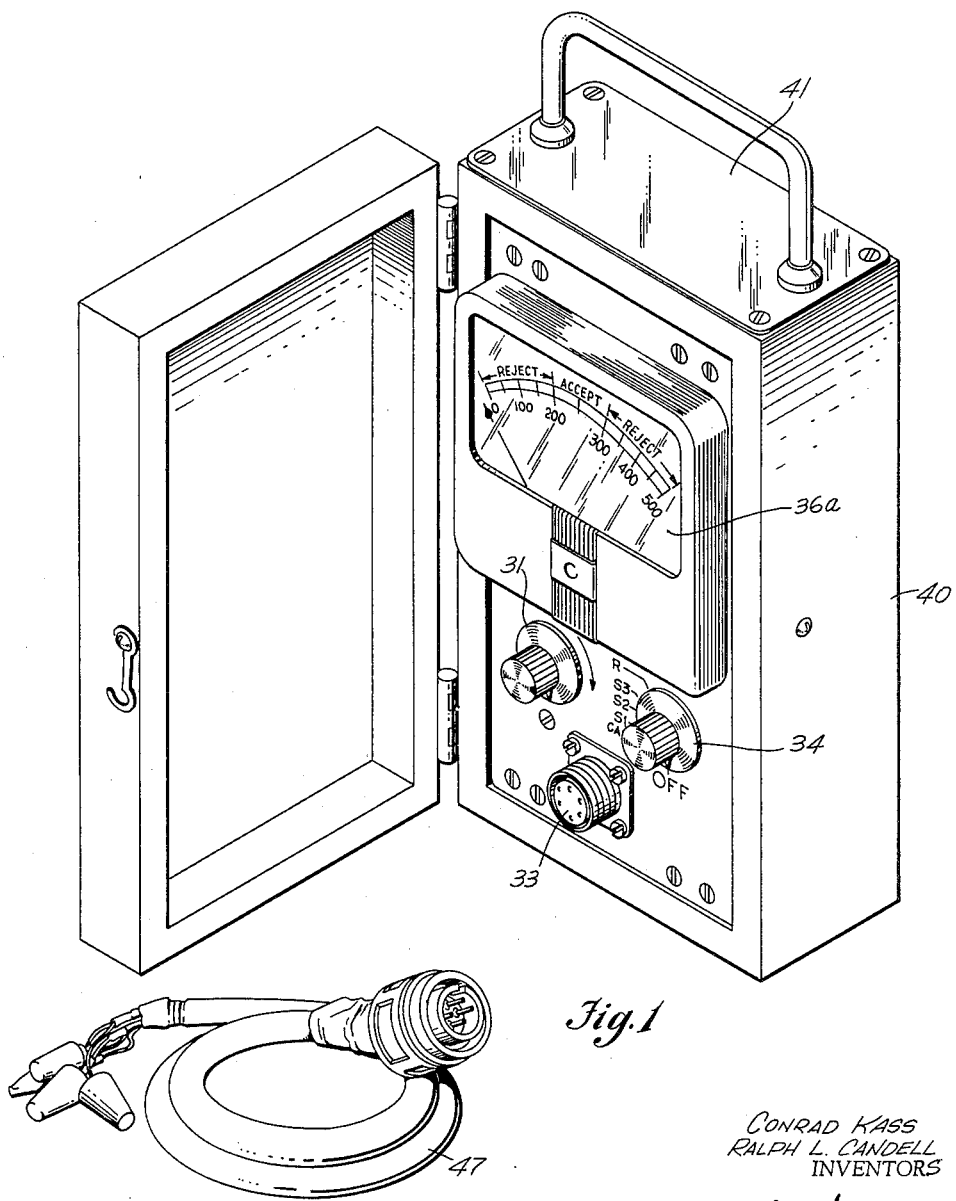

CONRAD KASS
RALPH L. CANDELL
INVENTORS

BY S. A. Giarratana,
George P. Ouyevolk
ATTORNEYS

Sept. 18, 1962     C. KASS ET AL     3,054,947
MAGNETIC DETECTOR TEST SET

Filed May 11, 1961     2 Sheets-Sheet 2

CONRAD KASS
RALPH L. CANDELL
INVENTORS

BY
ATTORNEYS

United States Patent Office 3,054,947
Patented Sept. 18, 1962

3,054,947
MAGNETIC DETECTOR TEST SET
Conrad Kass, Riverdale, and Ralph L. Candell, Fresh Meadows, N.Y., assignors to General Precision Inc., Little Falls, N.J., a corporation of Delaware
Filed May 11, 1961, Ser. No. 109,452
4 Claims. (Cl. 324—51)

The present invention relates to a magnetic detector test apparatus and more particularly to a test apparatus of the plug-in type which does not require the physical removal of the magnetic detector being tested from a device where the detector to be tested is installed.

Magnetic detectors are extensively used in aircraft gyro and stable platform systems. Heretofore, if a magnetic detector was suspected of being open, shorted, or unbalanced, there was no way of readily testing it. The detector was physically removed from the aircraft for test and another detector installed. This often meant much useless time-consuming effort on the part of the service mechanics. To check most of the detectors commercially available, a 400 cycle source is necessary. But, since in many places, 400 cycle sources are not readily available, this often required shipment of magnetic detectors which were suspected of being defective to places where they could be tested. With a 400 cycle signal source, tests could be made using a combination of a vacuum tube voltmeter and a volt ohmmeter. This then required the assembling and setting up of these components and the testing of the test components themselves prior to testing the magnetic detector. To carry out the test required some experience because incorrect test procedure would result in the tested detector becoming permanently magnetized and thus useless. Although many attempts have been made to provide a more efficient manner of testing magnetic detectors, none, as far as we are aware were completely successful when carried out into actual practice.

It has now been discovered that a magnetic detector testing apparatus can be provided which will readily test the detector and which does not require the physical removal of the detector from the aircraft.

Thus, an object of the present invention is to provide a magnetic detector test set which is a completely self contained piece of equipment to test magnetic detectors under conditions similar to those which exist in the system where the detector is located.

A further object of the present invention is to provide a magnetic detector test set which will enable the user to quickly determine whether the windings of a magnetic detector are balanced, unbalanced, open or shorted.

Broadly stated, the present invention contemplates a magnetic detector test set contained in a small portable case which includes a rechargeable battery; an oscillator circuit fed by the battery; an impedance matching circuit; a transformer arrangement feeding an A.-C. output at the oscillator frequency to a testing section; a testing section; a six pin connector in said section to join the three stator legs and the neutral, e.g., ground position, and to join the rotor legs of the detector under test as a load to the test set; a plurality of isolated resistors in said section; gang switch means connecting by one deck of the gang any of the three stator legs and the neutral or ground position in a circuit, the two ends of the rotor in a circuit, and closing the oscillator testing circuit, while, with a second deck of the gang, inserting in the circuit one of said isolated resistors which is to be placed in series with the stator legs, rotor, or the battery for test purposes; a spring loaded potentiometer in said section in series with said resistors for testing said stator legs and rotor; and, a voltmeter in said section to provide an indication of acceptability or rejection of the battery or component of the detector tested.

Figure 2:
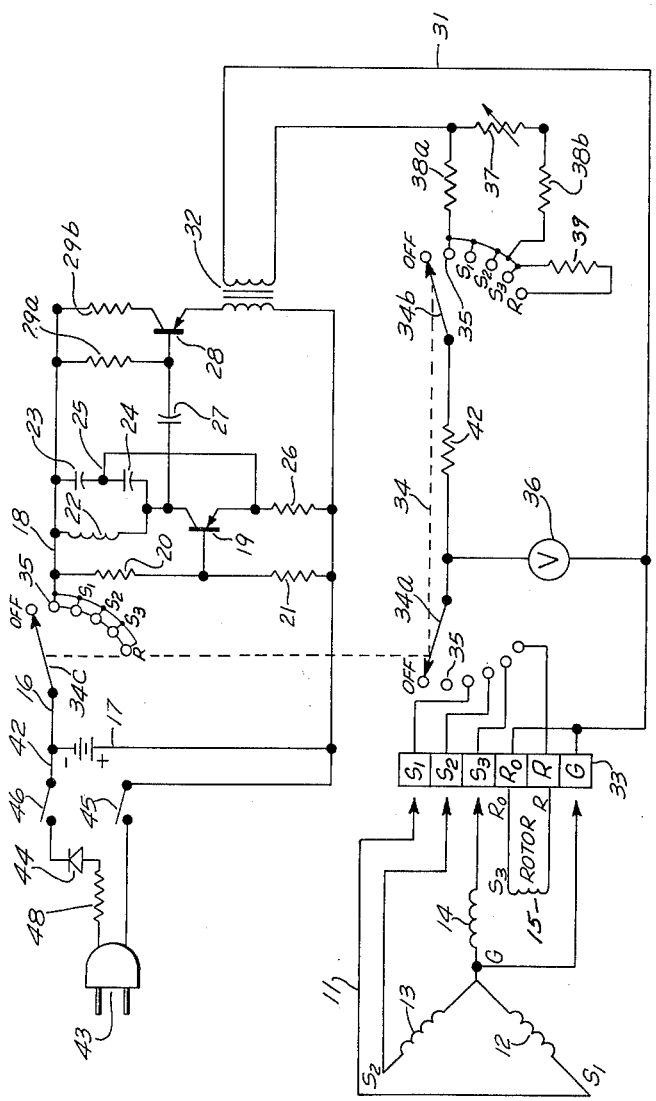

The invention as well as other advantages thereof will become more apparent from the following detailed description and the accompanying drawing in which:

FIGURE 1 is a perspective view of the magnetic detector test set contemplated herein; and, FIGURE 2 shows a schematic drawing of the test set illustrated in FIGURE 1.

The rotor and stator legs of a magnetic detector are usually checked for balance, open, short and range. The expression open and short is well understood in the art. By balance is simply meant that one set of windings will have the same impedance as the other set of windings. Range is the impedance of the component winding within tolerance. Several types of detectors are presently commercially made in accordance with government specifications. The usual detector will have three stator windings separated by an angle of 120 degrees and a rotor. The stator windings all join at a neutral e.g., ground position. The measurement to be made must be across each stator winding to neutral or ground, and across the rotor winding.

Shown in FIG. 2 is a schematic diagram of a detector 11 having stator windings 12 from $S_1$ to ground G; 13 from $S_2$ to ground G; and 14 from $S_3$ to ground G. A rotor winding 15 has ends $R_0$ and R. To test this unit, there is provided a test set 16 having a battery 17 used as the power source of a signal generator Colpitts oscillator 18. Preferably, Colpitts oscillator 18 will have as its principal element a PNP transistor 19 whose base is biased between resistors 20 and 21 in parallel with battery 17. Hhe collector and emitter of transistor 19 feeds a tank circuit having an inductance coil 22 and two voltage dividing capacitors 23 and 24, in series with their common connection 25 to the transistor emitter. The transistor emitter is in turn biased by a resistance 26. The tank circuit 22 is so adjusted as to provide a 400 cycle A.-C. output.

An emitter follower is provided past the oscillator for impedance matching. Thus, the output from the transistor may be fed across a coupling capacitor 27 controlling the base of transistor 28, the base and collector of which are biased by resistors 29a and 29b. Additionally, a biasing battery may be provided in the impedance matching circuit. The output of the signal generator is fed to a testing section 31 across the primary and secondary of transformer 32. The testing section 31 includes an Amphenol type six-pin connector 33 to connect the coil ends $S_1$, $S_2$, $S_3$, $R_0$, R, and G. Measurement of the stator coils will be across the coil to ground, i.e., from $S_1$, $S_2$ or $S_3$ to G which is ground, and measurement of the rotor will be across the rotor outputs, i.e., from R to $R_0$, where R is connected to ground. Connector 33 therefore has six female elements to receive the corresponding outputs from the unit under test. The ground point is always in the circuit, but each of the other positions are individually switched in the circuit by means of gang function selector switch 34 which by proper turning of the switch will provide a circuit between $S_1$ and G; $S_2$ and G; $S_3$ and G; as well as between R, $R_0$ and G. In addition, there is a switch oscillator test position 35 for testing the battery which leaves out the magnetic detector unit under test. A voltmeter 36 is in parallel with the switch output. The resistance of each winding under test will be measured with a 100 ohm spring loaded potentiometer 37 which, when loaded will bring the voltmeter to the correct indication, and, when released will gradually return to a null value. This eliminates the possibility of permanently magnetizing the magnetic detector if the power is turned off while current is flowing through a magnetic winding. Potentiometer 37 is likewise in parallel with the switch 34 and the secondary of transformer 32.

Gang switch 34 has three individual decks 34a, 34b and 34c. The three decks all move together. When in the off position, the circuit between the battery and the oscillator is open. Going from the off position to the test position 35 puts the oscillator in the battery circuit and places a battery test resistor 38a in the testing section 31. Moving from test position 35 to positions $S_1$, $S_2$, and $S_3$ will connect $S_1$ to G; $S_2$ to G; and $S_3$ to G into tthe test section circuit 31 and at the same time will place a stator winding test resistor 38b into the circuit. Moving on to position R will place the rotor winding R, $R_0$ to G in the test section circuit 31 and at the same time place the rotor winding test resistor 39 in the circuit. An additional resistor 42 is also used in series with the gang switch second deck to equalize the load across the switch.

The foregoing unit is readily packaged in an appropriate carrying case 40 having a visible indicator 36a which need only show the words "Accept" and "Reject." All that protrudes is the knob for gang switch 34, the knob for the winding of the spring loaded potentiometer 31, and the input connector 33. One end of case 40, in the present instance, the top end 41 may be opened so as to charge battery 17. Leads 42 are provided so as to charge the battery.

In order to give those skilled in the art a better understanding of the invention, a list of components actually used in practice is listed in the following table.

*Table of Parts*

| Drawing Number | Component | Trade Name and Number | Value |
|---|---|---|---|
| 17 | battery | RCA V5084 | 22½ V. |
| 19 | PNP transistor | GE 2N43 | |
| 20 | Resistor | | 27K. |
| 21 | do | | 22K. |
| 22 | Inductance Coil | | 1.5hy. |
| 23 | Capacitor | | .22μf. |
| 24 | do | | .22μf. |
| 26 | Resistor | | 22K. |
| 27 | Capacitor | | .22μf. |
| 28 | PNP transistor | Texas Inst. 2N185 | |
| 29a | Resistor | | 82K. |
| 29b | do | | 100 ohms. |
| 32 | Transformer (Qutronics). | | 1.5:1 (winding ratio). |
| 33 | Connector Amphenol | MS 3102-145-65 | 6 hole. |
| 34 | Gang Switch | Centralab PA-1013 | 3 gang. |
| 36 | Voltmeter | Simpson Mod. 49 | 500 ma. |
| 37 | Potentiometer, Spring Loaded. | | 100 ohms. |
| 38a | Resistor | | 2K. |
| 38b | do | | 68 ohms. |
| 39 | do | | 1K. |
| 42 | do | | 68 ohms. |

Since some magnetic detectors although electrically identical to the most popular type do not have common connectors which can be plugged directly into the test set, an adaptor cable is provided which has the aforementioned connector on one end to use with the test set connector. The other end of the adaptor cable 47 has alligator clips. These clips can be connected directly to the straight pin terminals of the magnetic detectors and the adaptor cable can readily be stored in the lid of the teset set.

Voltmeter 36 mounted on the front panel of the set is marked with a green accept area and a red reject area. These accept and reject areas are determined by the design tolerance of the magnetic detector. For any one magnetic detector, the stator windings must be balanced within certain divisions of each other in the green portion of the meter scale for the unit to be considered acceptable. The rotor winding must be in the green portion of the scale for it to be considered acceptable. Any stator or rotor reading falling in the red portion of the meter scale indicates a faulty magnetic detector. If there is an opening in the windings, the meter will deflect to the right hand reject portion of the scale.

To operate the magnetic detector test set, the following procedure is followed:

(1) The unit under test is connected to the test set.

(2) The function selector gang switch is rotated to "Calibrate" position. This is position number 35 on the schematic drawing. The meter pointer will deflect to the center line of the accept area on the meter scale if the oscillator is in proper working condition.

(3) The function selector switch is then rotated to the $S_1$ position. This places one of the stator windings in the measuring circuit.

(4) The potentiometer is rotated as far as it will go in the direction of the arrow.

(5) If the winding impedance is within specification, the needle of the meter will deflect into the green portion of the scale.

(6) The test potentiometer knob is then released allowing it to return to the Off position.

(7) The function selector gang switch is then rotated through positions $S_2$, $S_3$ and R and the test described for position $S_1$ is repeated for each position.

(8) At the conclusion of the test, the function selector gang switch is switched to the Off position and the detector connector is removed from the set.

The unit power supply is preferably a silver cadmium battery rechargeable from a 115 volt 60 cycle A.-C. source 43 through a unidirectional element 44. A 15K resistor 48 is used to limit the current in the charging circuit to 7 ma. A recessed male plug is located at one end of the carrying case to receive the 115 volt 60 cycle A.-C. recharging power. A toggle switch 45 is located next to the A.-C. plug to place the battery into either the tester circuit or the charge circuit. It is so arranged that it is impossible to leave this switch in the wrong position and cause damage. As shown in FIG. 1, the top of the case has a removable plate 41. This plate is removed to recharge the battery and the 115 volt 60 cycle source is plugged into the receptacle 46 provided for this purpose. The operate-charge switch 45 is then in the charge position, and in this position, the battery and charging unit are completely isolated from the circuits in the test set. This eliminates the possibility of the operator damaging either the test set or the magnetic detector if the function selector gang switch is not in the "off" position at the time that the battery is being charged. The battery described has a plateau voltage which is maintained within ±5% during its useable life. The entire unit is designed to operate at an ambient temperature of 20° C. and an atmospheric pressure of 29.92 inches of mercury.

It will be apparent to those skilled in the art, that our present invention is not limited to the specific details described above and shown in the drawings, and that various modifications are possible in carrying out the features of the invention and the operation and the method of support, mounting and utilization thereof, without departing from the spirit and scope of the appended claims.

We claim:

1. A magnetic detector test set comprising in combination; a battery; an oscillator circuit fed by the battery; an impedance matching circuit; a transformer arrangement feeding an A.-C. output at the oscillator frequency to a testing section; a testing section; a connector in said section to join the rotor legs of the detector under test as a load to the test set; a plurality of isloated resistors in said section; gang switch means connecting by one deck of the gang any of the three stator legs and the neutral or ground position in a circuit, the two ends of the rotor in a circuit, and closing the oscillator testing circuit, while, with a second deck of the gang, inserting in the circuit one of the said isolated resistors which is to be placed in series with the stator legs, rotor, or oscillator circuit for test purposes; a spring loaded potentiometer in said section in series with said resistors for testing said stator legs and rotor; and, meter means in said section to provide an indication of acceptability or rejection of the test unit oscillator circuit and battery or components of the detector tested.

2. A magnetic detector test set comprising in combination; a rechargeable battery; a Colpitts oscillator transistor circuit fed by the battery; an emitter follower impedance matching circuit; a transformer arrangement of a ratio of about 1.5 to 1 feeding an A.-C. output at the oscillator frequency to a testing section; a testing section; a connector in said section to join the three stator legs and the neutral position and to join the rotor legs of the detector under test as a load to the test set; a plurality of isolated resistors in said section; gang switch means connecting by one deck of the gang any of the three stator legs and the neutral or ground position in a circuit, the two ends of the rotor in a circuit, and closing the oscillator testing circuit, while, with a second deck of the gang, inserting in the circuit one of said isolated resistors which is to be placed in series with the stator legs, rotor, or oscillator circuit for test purposes; a spring loaded potentiometer in said section in series with said resistors for testing said stator legs and rotor; and, a meter means in said section to provide an indication of acceptability or rejection if the test unit oscillator circuit and battery or components of the detector tested.

3. A magnetic detector test set contained in a small portable case, comprising in combination; a rechargeable battery; an oscillator circuit fed by the battery; an impedance matching circuit; a transformer arrangement feeding an A.-C. output at the oscillator frequency to a testing section; a testing section; a six pin connector in said section to join the three stator legs and the neutral position and to join the rotor legs of the detector under tests as a load to the test set; a plurality of isolated resistors in said section; gang switch means connecting by one deck of the gang any of the three stator legs and the neutral or ground position in a circuit, the two ends of the rotor in a circuit, and closing the oscillator testing circuit, while, with a second deck of the gang, inserting in the circuit one of said isolated resistors which is to be placed in series with the stator legs, rotor, or oscillator circuit for test purposes; a spring loaded potentiometer in said section in series with said resistors for testing said stator legs and rotor; a voltmeter in said section to provide an indication of acceptability or rejection if the test unit oscillator circuit and battery or components of the detector tested, and, a battery charging circuit associated with said battery.

4. A magnetic detector test comprising in combination a small case containing a rechargeable battery; a Colpitts oscillator transistor circuit fed by the battery; an emitter follower impedance matching circuit; a transformer arrangement of a ratio of about 1.5 to 1 feeding on A.-C. output at the oscillator frequency to a testing section; a testing section; a six pin connector in said section to join the three stator legs and the neutral position and to join the rotor legs of the detector under test as a load to the test set; a plurality of isolated resistors in said section; gang switch means connecting by one deck of the gang any of the three stator legs and the neutral or ground position in a circuit, the two ends of the rotor in a circuit, and closing the oscillator testing circuit, while, with a second deck of the gang, inserting in the circuit one of said isolated resistors which is to be placed in series with the stator legs, rotor, or oscillator circuit for test purposes; a spring loaded potentiometer in said section in series with said resistors for testing said stator legs and rotor; a meter means in said section to provide an indication of acceptability or rejection if the test unit oscillator circuit and battery or components of the detector tested; and, a battery charging circuit associated with said battery.

References Cited in the file of this patent

UNITED STATES PATENTS

| | | |
|---|---|---|
| 2,653,305 | Shazo | Sept. 22, 1953 |
| 2,917,706 | Thompson | Dec. 15, 1959 |
| 2,939,079 | Willmore | May 31, 1960 |